(12) United States Patent
di Fazio et al.

(10) Patent No.: US 7,299,985 B2
(45) Date of Patent: Nov. 27, 2007

(54) TRANSMITTING ENHANCED SCANNER SIGNALS ON A SINGLE CHANNEL

(75) Inventors: Costanzo di Fazio, East Patchogue, NY (US); James R. Giebel, Centerport, NY (US); Gary Schneider, Stoney Brook, NY (US); Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 340 days.

(21) Appl. No.: 10/930,652

(22) Filed: Aug. 31, 2004

(65) Prior Publication Data

US 2006/0043192 A1    Mar. 2, 2006

(51) Int. Cl.
*G06K 7/10* (2006.01)

(52) U.S. Cl. .......................... 235/462.27; 235/462.19; 235/462.25

(58) Field of Classification Search ........... 235/462.12, 235/462.15, 462.18, 462.19, 462.25, 462.26, 235/462.27, 462.28
See application file for complete search history.

(56) References Cited

U.S. PATENT DOCUMENTS

| | | | |
|---|---|---|---|
| 3,838,251 A * | 9/1974 | Herrin .................. 235/462.19 |
| 4,251,798 A | 2/1981 | Swartz et al. ............ 235/462.2 |
| 4,360,798 A | 11/1982 | Swartz et al. .......... 235/462.27 |
| 4,369,361 A | 1/1983 | Swartz et al. ................ 235/470 |
| 4,387,297 A | 6/1983 | Swartz et al. .......... 235/462.21 |
| 4,409,470 A | 10/1983 | Shepard et al. ........ 235/462.35 |
| 4,460,120 A | 7/1984 | Shepard et al. ........ 235/462.46 |
| 5,302,813 A | 4/1994 | Goren .................... 235/462.27 |
| 5,478,997 A * | 12/1995 | Bridgelall et al. ...... 235/462.25 |
| 5,525,788 A * | 6/1996 | Bridgelall et al. ...... 235/462.08 |
| 5,608,202 A * | 3/1997 | Bridgelall et al. ...... 235/462.06 |
| 5,635,697 A | 6/1997 | Shellhammer et al. . 235/462.11 |
| 5,705,800 A | 1/1998 | Dvorkis et al. ........ 235/462.08 |
| 5,734,152 A * | 3/1998 | Goren et al. ........... 235/462.27 |
| 6,164,540 A | 12/2000 | Bridgelall et al. ...... 235/462.01 |
| 6,209,788 B1 | 4/2001 | Bridgelall et al. ...... 235/462.32 |
| 6,328,214 B1 * | 12/2001 | Akel et al. ............. 235/462.27 |
| 2004/0212688 A1* | 10/2004 | Takano et al. ........... 348/218.1 |

* cited by examiner

*Primary Examiner*—Michael G. Lee
*Assistant Examiner*—Kumiko C. Koyama
(74) *Attorney, Agent, or Firm*—Tarolli, Sundheim, Covell & Tummino LLP

(57) ABSTRACT

A system and method for encoding scanner signal strength and timing information provided, possibly on multiple signal lines, from a digitizer circuit into a signal that can be transmitted on a single line to a modified decoder. A multiplexing device multiplexes the multiple signals, which can be multi-bit or dual-DBP signals, into a single signal.

14 Claims, 4 Drawing Sheets

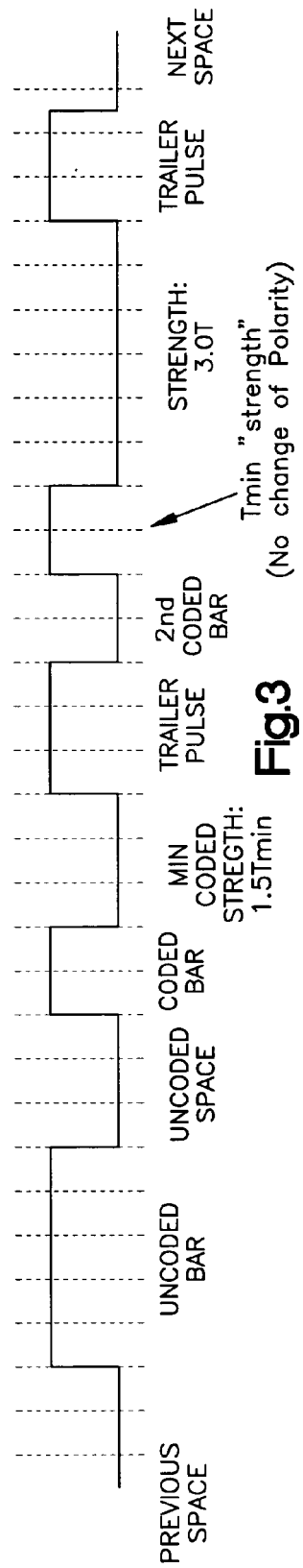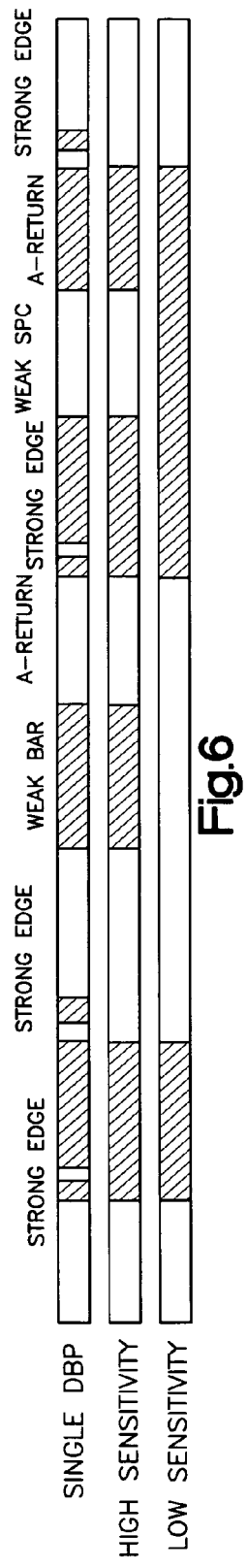

TRANSMITTING ENHANCED SCANNER SIGNALS ON A SINGLE CHANNEL

TECHNICAL FIELD

The invention relates generally to optical scanners, and in particular to scanners used for scanning optical codes such as bar code symbols.

BACKGROUND

Optical codes are patterns made up of image areas having different light reflective or light emissive properties, which are typically assembled in accordance with a priori rules. The term "bar code symbol" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor that is manually directed at a target code.

Most scanning systems, or scanners, generate a beam of light which reflects off a bar code symbol so the scanning system can receive the reflected light. The system then transforms that reflected light into electrical signals, digitizes the signals into a digital bar pattern (DBP) signal, and decodes the DBP signal to extract the information embedded in the bar code symbol. Scanning systems of this type are described in U.S. Pat. Nos. 4,251,798; 4,360,798; 4,369,361; 4,387,297; 4,409,470; and 4,460,120, all of which have been assigned to Symbol Technologies, Inc.

In recent years, enhanced signal processing techniques have been developed for integrated scanners and decoded scan engines. The enhanced signal processing techniques convey transition strength information in addition to the basic transition timing information that is provided by traditional signal digitizers. For example, multibit digitized signals are described in U.S. Pat. No. 5,302,813 to Goren, assigned to Symbol Technologies, Inc. and incorporated herein by reference in its entirety. While these scanner signals provide more detailed information about the analog signal being received by the detector, they require more complex interfaces between the digitizer and the decoder.

SUMMARY

Enhanced scanner signals that would normally require multiple signal lines to communicate transition timing and strength information are encoded into a signal that can be transmitted on a reduced number of signal lines. This arrangement allows existing signal line interfaces to be used to transmit the enhanced scanner signals which may then be decoded by a modified decoder.

In one embodiment, the digitizer outputs a timing signal indicative of the polarity and timing of transitions in the detection signal on one or more timing signal lines and a strength signal indicative of the strength of the transitions in the detection signal on one or more strength signal lines. The multiplexer receives the timing signal and strength signals for a given transition and encodes the timing and strength signals into a pulse train that is transmitted on a single signal line. The pulse train includes a coded indicator pulse indicating the polarity of the given transition followed by a strength pulse that correlates to the strength of the given transition. The strength pulse may have a duration that corresponds to the strength of the given transition. A trailer pulse may follow the strength pulse, having a duration that, when added to the duration of the coded indicator pulse and strength pulse, produces a pulse train having duration that is approximately equal to a time between the given transition and a next transition. The coded indicator pulse may have a duration that is shorter than a code pulse duration threshold.

In another embodiment, the digitizer outputs a low-sensitivity timing signal on a first signal line and a high-sensitivity timing signal on a second signal line. The multiplexer receives the low-sensitivity timing signal and the high-sensitivity timing signal and encodes the signals on a single line by transmitting a modified version of the high-sensitivity timing signal, wherein the high-sensitivity signal is modified by flagging strong transitions in the high-sensitivity signal that have corresponding low-sensitivity signal of the same polarity by transmitting a pair of relatively short coded indicator pulses at the start of the strong transition.

BRIEF DESCRIPTION OF THE DRAWINGS

FIG. 2 is a timing diagram of a multi-bit DBP signal as it is encoded according to an embodiment of the present invention;

FIG. 3 is a timing diagram of a multi-bit DBP signal as it is encoded according to an embodiment of the present invention;

FIG. 6 is a timing diagram of a dual DBP signal that is encoded according to an embodiment of the present invention and the DBP signals that generated the merged signal;

DETAILED DESCRIPTION OF PREFERRED EMBODIMENTS

Figure 1:
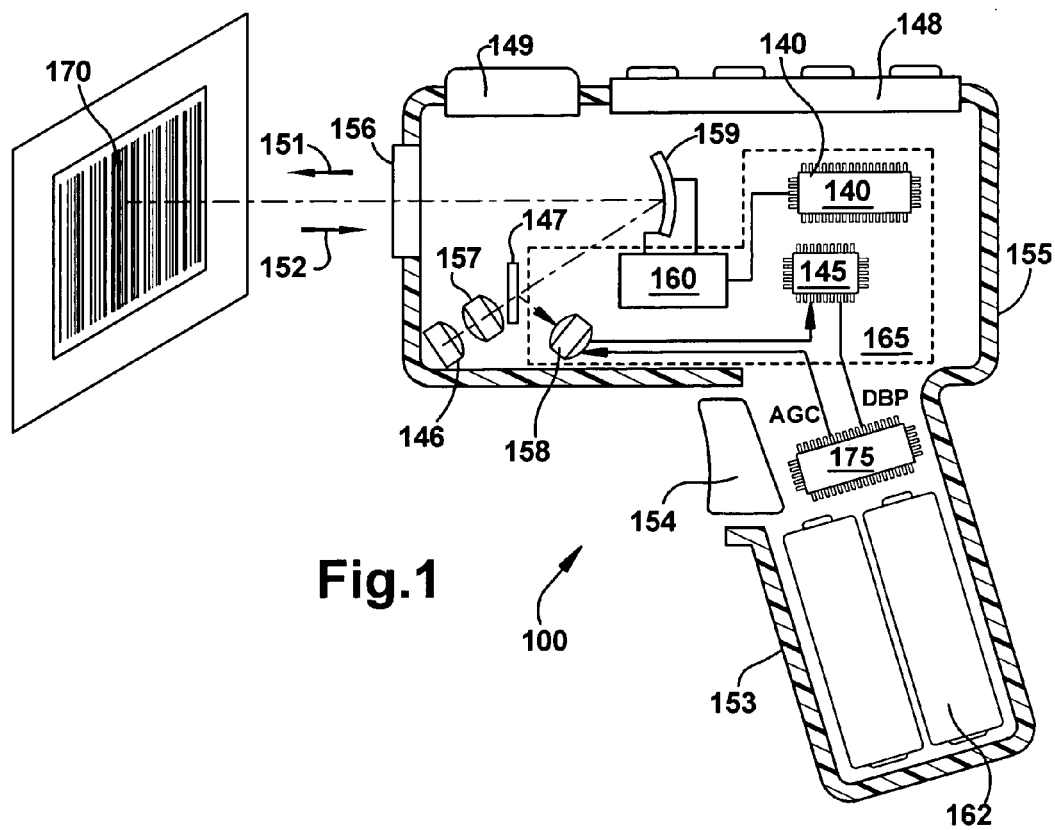
FIG. 1 is a functional overview of a scanner that incorporates an embodiment of the present invention.

FIG. 1 shows a simplified embodiment of a bar code scanner 100. While the bar code scanner depicted in FIG. 1 is a hand held device, other types of scanners may be used to practice the signal encoding technique described below. A user aims the scanner 100 at a bar code symbol 170 without physically touching it. Typically, scanner 100 operates several inches from the bar code symbol being read. Scanner 100 my be gun-shaped in a housing 155 having a pistol grip handle 153. A movable trigger 154 on handle 153 allows a user to activate a light beam 151 and associated detector circuitry when the user has pointed scanner 100 at a symbol 170.

The housing 155 contains a laser light source 146, lens 157, partially-silvered mirror 147, detector 158, oscillating mirror 159, motor 160, battery 162, CPU 140, and digitizer circuit 145. The components shown within the hashed line indicated by reference character 165 are commonly known as a "scan engine" and control the scanning functions as well as the detection and digitization of the resulting analog signal. A decoder 175 is shown removed from the scan engine but located within the housing 155. In some applications the decoder is located in a remote location such as a user terminal. The decoder 175 receives the DBP signal from the digitizer 145 on a single signal line in the described embodiment. However, any digitizer to decoder interface that utilizes a digitizer that encodes an enhanced signal onto a reduced number of signal lines to convey transition timing and strength information can be used in the practice of the present invention.

When a user activates the scanner by pulling the trigger 154, the light source 146 generates a light beam 151 along the axis of lens 157. The lens 157, which is not necessary in all embodiments, may be a single lens or a multiple lens system. After passing through the lens 157, the beam 151 passes through the partially-silvered mirror 147, and if desired, other lenses or beam shaping structures. The beam 151 then strikes oscillating mirror 159 driven by a scanning motor 160, which together direct the beam 151 in a scanning pattern.

The light beam 152 is the light from the beam 151 that is reflected off the symbol 170. The beam 152 returns to the scanner 100 along a path parallel to, or at times coincident with, the beam 151. The beam 152 thus reflects off the mirror 159 and strikes the partially-silvered mirror 147. The mirror 147 reflects some of the beam 152 into a light-responsive detector 158 that converts the light beam 152 into analog electric signals. The electric signals then pass into the digitizer 145 and decoder 175 to be processed and decoded to extract the information represented by the bar code. The microprocessor 140 is also used to control the operation of the motor 160 to adjust the scanning pattern and provide other control.

Overview of Basic and Enhanced Signals

Several types of signals have been used to communicate information from the digitizer 145 in the scan engine to the decoder 175. A traditional single-DBP signal is a pulse width coded (modulated) wave representing specific transition times of the analog signal from the detector 158 that is transmitted across a single signal line to the decoder 175. The resulting pulse width coded wave indicates when (relative to a Start of Scan signal) the scanning beam transitioned from light to dark areas (and vice versa) that were sufficiently different in optical contrast to be detected by the digitizer circuit. The polarity of this signal indicates the presumed lightness or darkness of the surface as it is traversed by the scanning beam. No information is provided, however, as to whether a transition was relatively weak (barely crossing the threshold) or strong (representing a significant and sudden change in optical contrast).

A Multi-bit enhanced scanner signal typically comprises two time-coordinated signals: timing and strength. The timing signal again indicates when (relative to a Start of Scan signal) transitions from light to dark (and vice versa) occurred. The strength signal (whether Area strength or Edge strength) provides additional information to the decoder that can be used to determine which of the timing signal's transitions were due to print defects or noise, and which transitions truly represent the edges of the signal's bars and spaces. The relative strength of the transitions can also provide clues about relative depth of modulation, which can aid in deblurring the signal. The strength information is typically conveyed using multiple parallel or serial pulses to convey an 8-bit value.

A Dual-DBP signal typically comprises two time-coordinated signals: each is a traditional DBP signal, but one signal was generated using a more sensitive digitizer threshold than the other. The dual-digitizer circuit has been designed so that a transition on the high-sensitivity digitizer that is confirmed by a transition that also occurred on the low-sensitivity digitizer is indicative of a relatively strong analog signal (having a relatively large amplitude). Transitions on the high-sensitivity digitizer that are not so confirmed by the low-sensitivity digitizer are indicative of a relatively weak analog signal. Therefore the output signal of the high-sensitivity digitizer may contain more pairs of transitions than the output signal of the low-sensitivity digitizer. For example, a single bar pulse on a noisy analog signal may be "broken up" into a bar/space/bar triplet of pulses on the high-sensitivity digitizer's signal due to a subtle print defect in the bar. The bar may be properly detected by the low-sensitivity digitizer, thus facilitating proper decoding of the overall pattern.

While the enhanced signals provide an improved ability to decipher bar code symbols of varying quality, they cannot be sent over the conventional single signal line interface between scan engines that provide a single DBP signal to a decoder.

This problem is addressed by multiplexing the enhanced signals (either multi-bit or dual-DBP) onto a single DBP channel, so that no hardware modifications are required. Neither the connectors nor the acquisition ASIC need to change. The multiplexed-DBP engine-output option can be enabled and utilized by a scanner driver that is aware of the new feature, but older versions of the terminal software will by default receive the standard single-DBP signal. Thus compatibility is maintained between the hardware and software of current and future terminals so that new engines can be dropped into existing terminals without modification, and when desired, the terminal's software can be upgraded to take advantage of the enhanced signals.

Multiplexing Multi-Bit DBP Signals to a Single Signal

Figure 4:
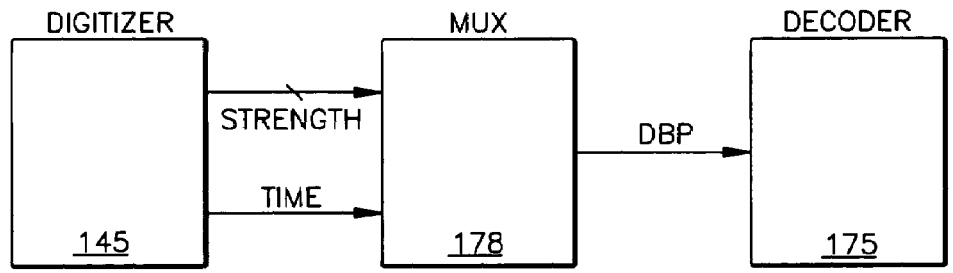
FIG. 4 is a block diagram of a encoding system for performing an embodiment of the present invention.

As described above, a multi-bit DBP signal consists of a timing signal and a strength signal. As described in U.S. Pat. No. 6,209,788 to Bridgelall et al. and assigned to Symbol Technologies and incorporated herein by reference in its entirety, in its present embodiment, the multi-bit DBP signal is transmitted from the digitizer to the decoder over two lines, a edge strength line and a polarity signal line as shown generally in FIG. 4. The strength signal is not limited to one bit (strong or weak), but may vary over a range (typically 8 bits of range). This use of two signal lines requires an interface between the digitizer and decoder that includes an additional signal line when compared to the tradition single DBP system discussed above.

It is advantageous, then, to encode the multi-bit information in a manner that permits the information to be transmitted across a single line. Precise measurement of the strength is not necessary since any gradations will be helpful information for the decoder. Thus, a sufficient approximation of the varying strength information can be conveyed by using pulse-width modulation (rather than using multiple parallel or serial pulses to convey the precise 8-bit value). Timing information needs to be conveyed also. To do all of this on a single signal line, the known bandwidth limits of the scanning system is leveraged. That is, the optical and electronic characteristics of the system combine to create a lower limit for how short a pulse can be generated by scanning contrast variations on the target object. Thus, at the time of a bar/space transition, an additional "coded indicator", or flag, pulse is introduced, shorter than the minimum legitimate bar/space pulse, indicating a "coded" transition. The coded indicator pulse is followed by the varying length pulse indicating the relative strength of the transition, in turn followed by a varying length "trailer" pulse that "fills out" the true duration of the bar or space element. If a new bar or space does not include this short leading pulse, then it is treated as "uncoded," and is interpreted as a minimum-strength "very weak" transition (and no strength-modulated pulse follows). The decoder can be programmed with the knowledge that any pulse shorter than the minimum legitimate bar/space duration is in fact the extra pulse that introduces a "coded" element (including pulse-width-modulated strength information).

As is the case with a true multi-bit signal, the multiplexed multi-bit signal will be able to indicate the sequence of a weak edge followed by a stronger edge of the same polarity. The multiplexed multi-bit signal will not always be able to indicate the converse case (a strong edge followed by a weaker edge of the same polarity), but this case usually corresponds to a defect or noise within an element, and little is lost by ignoring a weak transition following a strong one of the same polarity.

Figure 5:
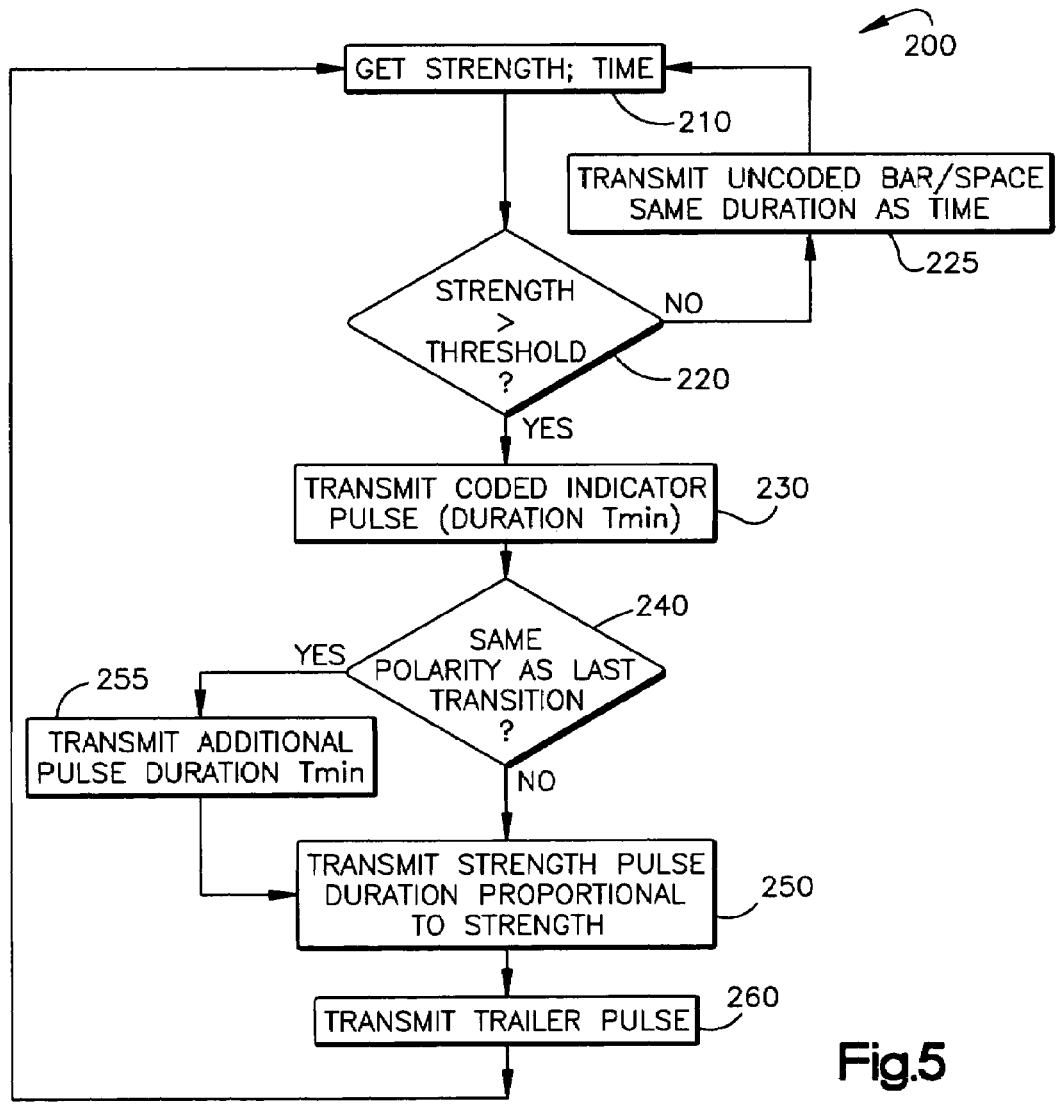
FIG. 5 is a flowchart of a method for encoding a multi-bit DBP signal according to an embodiment of the present invention.

FIGS. 2 and 3 illustrate the pulse train that is the multiplexed signal corresponding to various bar code inputs. "$T_{min}$" is the name given to the width of a coded indicator pulse (shorter than a legitimate bar or space pulse). FIG. 5 is a flow chart illustrating one method 200 the multiplexer 178 in FIG. 4 can use to multiplex the strength and timing lines into a single DBP signal. A pair of strength and time inputs is received by the multiplexer at 210. If the strength signal is less than a threshold, an uncoded bar/space pulse, detectably longer than $T_{min}$ is transmitted to the decoder (220, 225). If the strength signal exceeds the threshold, a coded indicator pulse is transmitted having a duration of about $T_{min}$ in 230. The polarity of the present transition is compared to the polarity of the prior transition at 240 and if the polarity has changed, as is normally the case, a strength pulse is transmitted with a duration proportional to the strength in 250. If the polarity has not changed, as is the case with a weak edge followed by a stronger edge of the same polarity, a second indicator pulse is transmitted with duration $T_{min}$ at 235, followed by a strength pulse at 250. At 260 a trailer pulse follows the strength pulse so that the total time to the next transition is equal to the duration of the current bar/space element. The decoder 175 (FIG. 4) will decode the DBP pulse train in a manner that corresponds to the manner of encoding the information just described as 200.

Multiplexing Dual-DBP Signals to a Single Signal

As described above, a dual-DBP signal consists of two traditional DBP signals, generated at different thresholds. However, this pair of signals can also be logically viewed as a single (high-sensitivity) DBP signal, accompanied by a second signal representing a single bit of edge strength information. Viewed this way, the pair of signals informs the decoder that each transition of the high-sensitivity signal is either "strong" (defined as "strong" enough to trigger the low-sensitivity digitizer too) or "weak" (i.e., not significant enough to trigger the low-sensitivity digitizer).

This view of the signal (timing plus one bit of strength) can be conveyed over a single signal, again by taking advantage of the known bandwidth limits of the scanning system. A pair of extra transitions, or coded indicator pulses, are introduced for "coded" elements, but the second pulse in this case is nominally the same fixed length as the first (because no varying strength information is conveyed). By superimposing this extra pair of very-short pulses (detectably shorter than the minimum real bar/space pulse) on the high-sensitivity DBP signal, each transition can be flagged as either strong or weak. Each "strong" transition is flagged in the described embodiment with an extra pair of short coded indicator, or flag, pulses, but in other embodiments, "weak" transitions could be so flagged instead. It may be advantageous to flag strong transitions, based on the assumption that the weakest transitions will correspond to the smallest bars and spaces (which leave the least "room" for the extra pair of pulses).

The single multiplexed (or "merged") DBP signal, as would be derived from a portion of a dual-DBP signal, is shown graphically in FIG. 6. The precise durations of the two short coded indicator pulses (indicating each "strong" edge) are not critical, so long as they are measurably shorter than the shortest legitimate DBP pulse that the scanning system normally produces. This coding scheme is advantageous because of its ease of implementation in simple analog circuitry, so that it can be incorporated into analog ASICs.

Although this scheme encodes no variable data in the second short pulse, the second pulse ensures that the multiplexed output corresponds in polarity to the high-sensitivity input (except during each second short pulse). This provides some noise immunity for the de-multiplexing process, and allows the decoder to at least recover the high-sensitivity signal even if it "misses" one or more of the short pulses.

Figure 7:
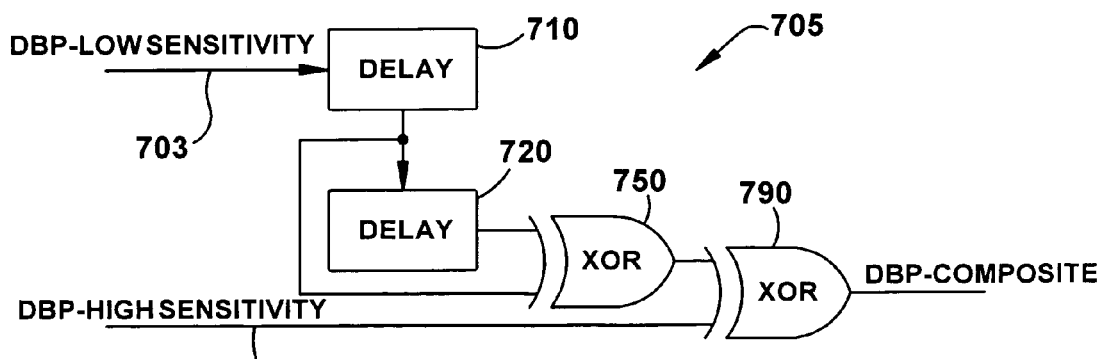
FIG. 7 is simplified circuit diagram that encodes two DBP signals according to an embodiment of the present invention.

FIG. 7 is a simplified implementation of a multiplexer circuit 705 that encodes dual-DBP signals to a multiplexed (or composite) DBP signal as illustrated in FIG. 6. The circuit 705 contains two delay blocks 710, 720 and two XOR gates 750, 790. The circuit 705 has two input signals: a low-sensitivity DBP signal 703 and a high-sensitivity DBP signal 706 that are produced by the Dual-DBP digitizer. The circuit 705 has one output, which is the multiplexed or composite DBP signal.

A low sensitivity signal 703 from the Dual-DBP digitizer is input to the first delay block 710. The output of the first delay block 710 is input to the first XOR gate 750. The other input to the XOR gate 750 is the output of the second delay block 720 that acts on the output of the first delay block 710. The output of the first XOR gate 750 is input to the second XOR gate 790 that has as its other input the high-sensitivity signal 706. The circuit 705 injects a pulse of duration equal to the time delay produced by each of the delay blocks 710, 720 whenever the low-sensitivity DBP signal 703 makes a transition and assuming that the high-sensitivity DBP signal 706 also makes a transition.

Figure 8:
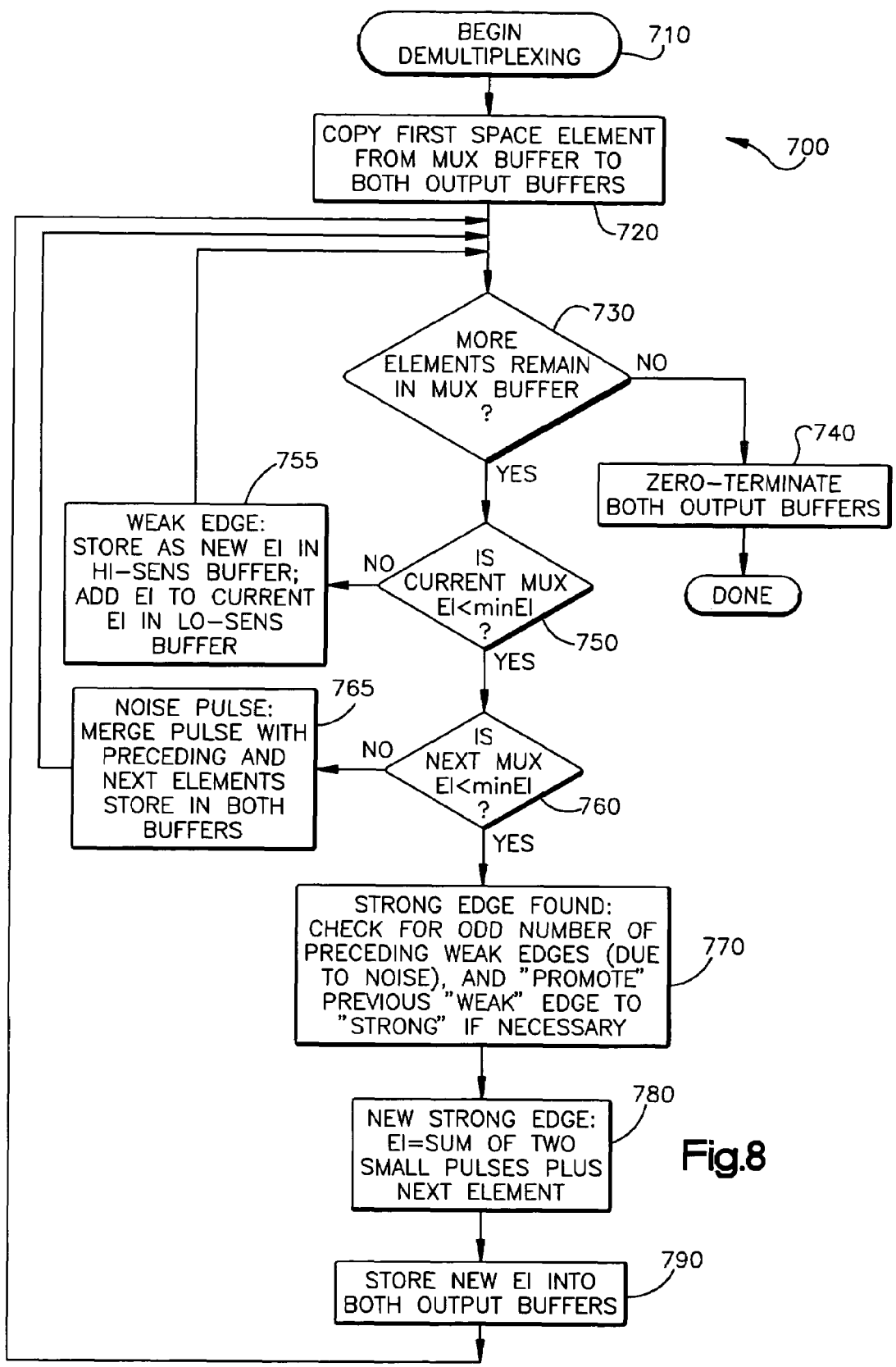
FIG. 8 is a flowchart outlining a method of decoding an encoded signal according to an embodiment of the present invention.

FIG. 8 is a flowchart that outlines a method that can be used by the decoder 175 to decode the DBP output of the circuit in FIG. 7 back into high-sensitivity and low-sensitivity signals as stored in corresponding buffers. At 710-730, a determination is made as to whether there are any further transitions to be decoded, and if not, decoding is terminated. If there are further transitions, at 750 the current transition is examined and if the duration since the last transition is not less than a minimum threshold duration, indicating that a weak transition has been detected, the transition is stored as a new element in the high-sensitivity buffer, and the time is added to the current element in the low-sensitivity buffer at 755. If the duration since the last transition is found to be less than the minimum pulse duration threshold at 750, at 760 the next pulse is examined to see if it is a coded indicator pulse (also having duration less than the minimum pulse duration threshold). If the pulse is not a coded indicator pulse, then the first pulse is determined to be noise and is merged with the preceding elements in the high and low-sensitivity buffers. If the pulse is a coded indicator pulse, it is determined that the pulse indicates a strong transition. If (due to noise) an odd number of weak transitions preceded the pulse the previous weak transition is promoted to a strong edge at 770. Since a new strong transition is detected, a new element is stored in both the high and low-sensitivity buffers corresponding to the sum of the three pulses (the two short pulses and the long pulse that followed). Outputting the contents of the high and low-sensitivity buffers will produce two outputs roughly corresponding to the inputs that were encoded by the circuit shown in FIG. 7.

It can be seen from the foregoing description, that multiplexing a plurality of scanner timing and strength signals onto a single signal line simplifies the interface between the digitizer and decoder. Although the invention has been described with a certain degree of particularity, it should be understood that various changes can be made by those skilled in the art without departing from the spirit or scope of the invention as hereinafter claimed.

We claim:

1. An apparatus that acts on a bar code comprising:
   a light detector that detects light reflected back from a surface on which a bar code may be present and provides a detection signal corresponding to the timing and strength of changes in the amplitude of the reflected light;
   a digitizer that translates the detection signal and outputs a plurality of digitizer signals representative of the timing and strength of those changes in the detection signal that correspond to transitions between light and dark areas on the surface, wherein the digitizer outputs a timing signal indicative of the polarity and duration of transitions in the detection signal on one or more timing signal lines and a strength signal indicative of the strength of the transitions in the detection signal on one or more of strength signal lines;
   a multiplexer that encodes the plurality of digitizer signals into a single digital signal, wherein the multiplexer receives the timing signal and strength signals for a given transition and encodes the iming and strength signals into a single signal by transmitting a pulse trak for the given transition that includes a coded indicator pulse indicating the polarity of the given transition followed by a strength pulse that correlates to the strength of the given transition.

2. The apparatus of claim 1 wherein the strength pulse has a duration that is proportional to the strength of the given transition.

3. The apparatus of claim 1 wherein the multiplexer transmits a trader pulse that follows the strength pulse, wherein the trailer pulse has a duration that, when added to the duration of the coded indicator pulse and strength pulse, produces a pulse train having a total duration that is approximately equal to a time between the given transition and a next transition.

4. The apparatus of claim 1 wherein the coded indicator pulse has a duration that is shorter than an uncoded pulse duration threshold.

5. The apparatus of claim 1 wherein, when the strength signal indicates a strength below a strength threshold, the multiplexer transmits an uncoded pulse having the same duration and polarity as a corresponding portion of the timing signal.

6. An apparatus that acts on a bar code comprising:
   a light detector that detects light reflected back from a surface on which a bar code may be present and provides a detection signal corresponding to the timing and strength of changes in the amplitude of the reflected light;
   a digitizer that translates the detection signal and outputs a plurality of digitizer signals representative of the timing and strength of those changes in the detection signal that correspond to transitions between light and dark areas on the surface; and
   a multiplexer that encodes the plurality of digitizer signals into a single digital signal wherein, when the timing signal indicates that the polarity of the given transition is the same as the preceding transition, the multiplexer transmits a pair of coded indicator pulses each having a duration below a strength pulse duration threshold.

7. The apparatus of claim 6 wherein the digitizer outputs a low-sensitivity timing signal on a first signal line and a high-sensitivity timing signal on a second signal line.

8. An apparatus that acts on a bar code comprising:
   a light detector that detects light reflected back from a surface on which a bar code may be present and provides a detection signal corresponding to the timing and strength of changes in the amplitude of the reflected light;
   a digitizer that translates the detection signal and outputs a plurality of digitizer signals representative of the timing and strength of those changes in the detection signal that correspond to transitions between light and dark areas on the surface, wherein the digitizer outputs a low-sensitivity timing signal on a first signal line and a high-sensitivity timing signal on a second signal line; and
   a multiplexer that encodes the plurality of digitizer signals into a single digital signal, wherein the multiplexer receives the low-sensitivity timing signal and the high-sensitivity timing signal and encodes the signals on a single line by transmitting a modified version of the high-sensitivity timing signal, wherein the high-sensitivity signal is modified by flagging relatively strong transitions in the high-sensitivity signal that have corresponding low-sensitivity transitions by transmitting a pair of relatively short coded indicator pulses at the start of the strong transition.

9. The apparatus of claim 8 wherein the multiplexer comprises a first XOR gate that combines a version of the low sensitivity signal that has been delayed by a first period of time with a second version of the low sensitivity signal that has been delayed by a second period of time and a second XOR gate that combines the output of the first XOR gate with the high sensitivity signal to produce the pair of coded pulses at the start of the strong transition.

10. A method that processes a scanner signal comprising:
    receiving a set of signals indicative of the timing and strength of transitions in a corresponding detected light signal, wherein the set of signals includes, for a given transition in the detected light signal, a timing signal having a duration and polarity corresponding to the given transition and a strength signal corresponding to a relative strength of the given transition, wherein the signals are transmitted on a plurality of signal lines; and encoding the signals transmitted on the plurality of signal lines into an encoded signal that can be transmitted on a single signal line, wherein the set of signals is encoded into an encoded pulse train for the given transition by:

transmitting a coded pulse of the same polarity as the given transition; and transmitting an encoded strength pulse having a duration that correlates with the strength of the given transition, wherein the encoded strength pulse has a duration that is proportional to the strength of the given transition and further comprising transmitting a trailer pulse such that, when the duration of the coded indicator pulse, encoded strength pulse, and trailer pulse are added together the encoded pulse train has a duration equal to the duration of the given transition.

11. The method of claim 10 comprising transmitting an uncoded pulse of the same duration and polarity as the given transition when the strength signal of the given transition is below a strength threshold.

12. A method that processes a scanner signal comprising:

receiving a set of signals indicative of the timing and strength of transitions in a corresponding detected light signal, wherein the set of signals includes, for a given transition in the detected light signal, a timing signal having a duration and polarity corresponding to the given transition and a strength signal corresponding to a relative strength of the given transition, wherein the signals are transmitted on a plurality of signal lines; and encoding the signals transmitted on the plurality of signal lines into an encoded signal that can be transmitted on a single signal line, wherein the set of signals is encoded into an encoded pulse train for the given transition by:

transmitting a coded pulse of the same polarity as the given transition; and transmitting an encoded strength pulse having a duration that correlates with the strength of the given transition, comparing the polarity of the given transition with the polarity of a preceding transition and transmitting a pair of coded indicator pulses when the polarity of the given transition is he same as the preceding transition.

13. The method of claim 12 wherein the set of signals includes a low-sensitivity timing signal and a high-sensitivity timing signal.

14. A method that processes a scanner signal comprising:

receiving a set of signals indicative of the timing and strength of transitions in a corresponding detected light signal, wherein the set of signals includes a low-sensitivity timing signal and a high-sensitivity timing signal, wherein the signals are transmitted on a plurality of signal lines; and encoding the signals transmitted on the plurality of signal lines into an encoded signal that can be transmitted on a single signal line, the set of signals being encoded by:

comparing low-sensitivity timing signal to the high-sensitivity signal;

modifying the high-sensitivity timing signal by imbedding a coded indicator pulse in the high-sensitivity signal consisting of a short duration pulse of opposite polarity to the high-sensitivity signal when the high-sensitivity signal and low-sensitivity signal are congruent; and transmitting the modified high-sensitivity signal across a single signal line.

* * * * *

UNITED STATES PATENT AND TRADEMARK OFFICE
CERTIFICATE OF CORRECTION

| | | |
|---|---|---|
| PATENT NO. | : 7,299,985 B2 | Page 1 of 1 |
| APPLICATION NO. | : 10/930652 | |
| DATED | : November 27, 2007 | |
| INVENTOR(S) | : di Fazio et al. | |

It is certified that error appears in the above-identified patent and that said Letters Patent is hereby corrected as shown below:

IN THE DRAWINGS

In Fig. 3, Sheet 2 of 4, delete "STREGTH:" and insert -- STRENGTH: --, therefor.

IN THE CLAIMS

In Column 7, Line 52, in Claim 1, delete "iming" and insert -- timing --, therefor In Column 7, Line 53, in Claim 1, delete "trak" and insert -- train --, therefor.

In Column 7, Line 62, in Claim 3, delete "trader" and insert -- trailer --, therefor In Column 10, Line 9, in Claim 12, delete "he" and insert -- the --, therefor.

Signed and Sealed this

Seventeenth Day of November, 2009

David J. Kappos
*Director of the United States Patent and Trademark Office*